United States Patent [19]

Gebelein, Jr. et al.

[11] 3,739,156

[45] June 12, 1973

[54] FREQUENCY MULTIPLIER

[75] Inventors: Edward F. Gebelein, Jr., Harwinton; Michael H. Dawes, New Hartford, both of Conn.

[73] Assignee: Chandler Evans Inc., West Hartford, Conn.

[22] Filed: July 21, 1971

[21] Appl. No.: 164,785

[52] U.S. Cl. ........ 235/150.3, 235/92 FQ, 307/220, 328/156, 328/160

[51] Int. Cl. ........ G01r 23/02

[58] Field of Search ........ 235/150.3, 151.31, 235/92 FQ; 307/73, 220, 271; 321/61; 328/15, 38, 136, 140, 156, 160

[56] References Cited

UNITED STATES PATENTS

| | | | |
|---|---|---|---|
| 2,853,235 | 9/1958 | Brinster et al. | 235/92 DM X |
| 3,588,473 | 6/1971 | Meyer | 235/92 FQ |
| 2,951,986 | 9/1960 | Gordon | 235/150.3 |
| 3,612,845 | 10/1971 | Lawlor | 235/150.3 X |
| 3,325,721 | 6/1967 | Clark | 307/271 X |
| 3,596,065 | 7/1971 | Lazarchick et al. | 235/150.3 X |
| 3,474,236 | 10/1969 | Batte | 235/150.3 |

*Primary Examiner*—Eugene G. Botz
*Assistant Examiner*—Jerry Smith
*Attorney*—David S. Fishman and Roger A. Van Kirk

[57] ABSTRACT

Apparatus for producing an output signal, in digital form, which is commensurate with the product of two input signals with frequencies proportional to the information contained therein. Packets of pulses at a first frequency, the first frequency being commensurate with the first input signal, are loaded into an output counter with the number of packets per unit of time being commensurate with the second input frequency.

11 Claims, 1 Drawing Figure

PATENTED JUN 12 1973 3.739.156
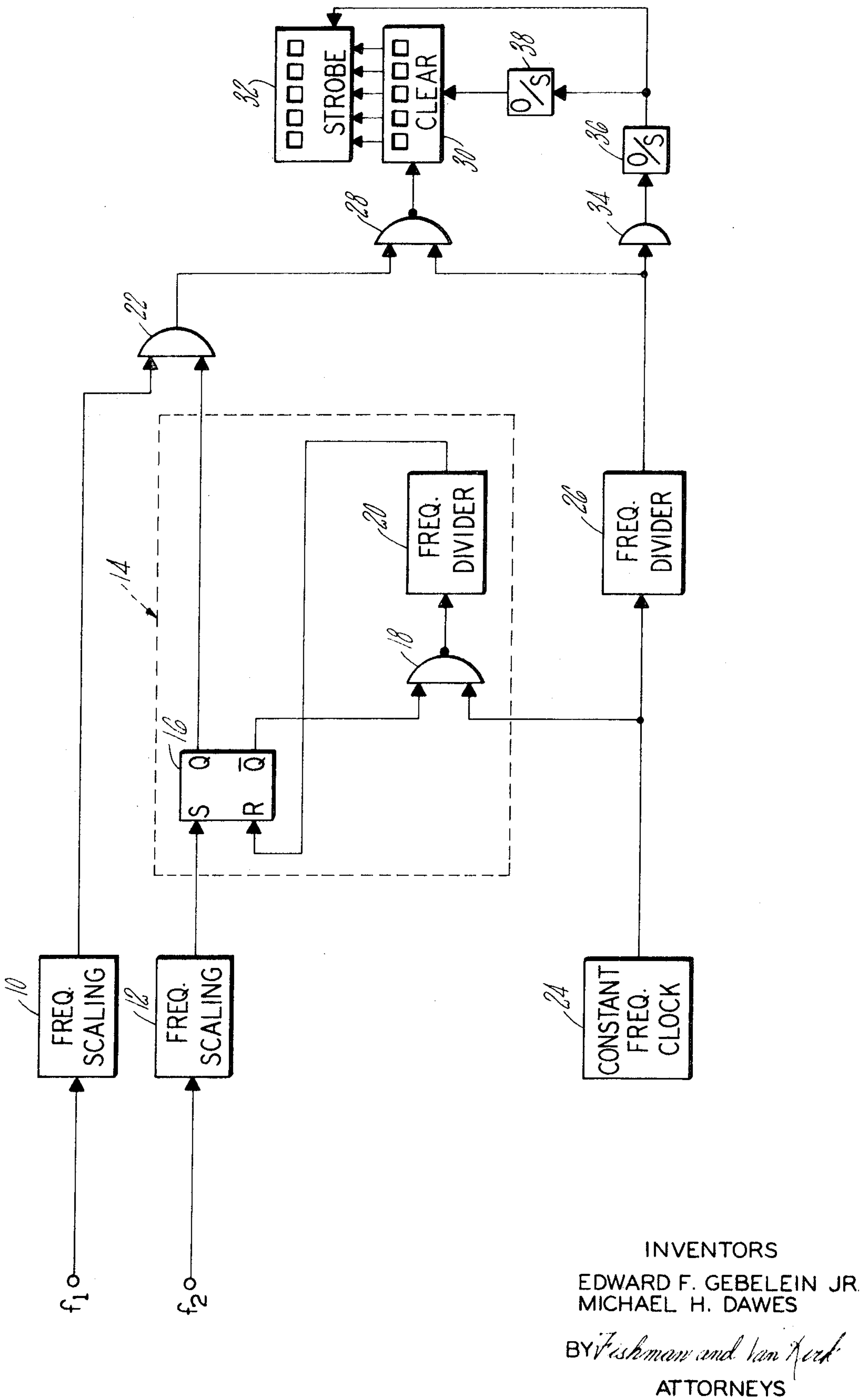
INVENTORS
EDWARD F. GEBELEIN JR.
MICHAEL H. DAWES
BY Fishman and Van Kirk
ATTORNEYS

FREQUENCY MULTIPLIER

BACKGROUND OF THE INVENTION

1. Field of the Invention

The present invention relates to frequency multiplication. More specifically, the present invention is directed to apparatus for obtaining the product of two input signals having frequencies proportional to the information contained therein. Accordingly, the general objects of the present invention are to provide novel and improved methods and apparatus of such character.

2. Description of the Prior Art

There are numerous situations, particularly in control systems for rotatory machinery, where it is necessary to multiply a pair of quantities or bits of data presented in the form of alternating signals each having a frequency commensurate with the data. While it has previously been possible to multiply a variable input frequency signal by a constant, direct multiplication of a pair of input frequencies without resort to complicated demodulation techniques has not previously been accomplished. Restated, the digital multiplication of a pair of input frequencies has previously been considered beyond the capabilities of the art.

SUMMARY OF THE INVENTION

The present invention provides a novel technique for obtaining the product of a pair of input signals containing information in the form of signal frequency and apparatus for use in the practice of the technique. In accordance with the invention, the incoming signals which are to be multiplied together are frequency scaled so that one is substantially higher in frequency than the other. The lower frequency input signal is employed to trigger a precision one shot multivibrator once for each cycle of the scaled lower frequency signal. The constant width output pulses from the precision multivibrator are employed to gate the scaled higher frequency input signals into a counter; the counter thus receiving pulse packets. The gated high frequency pulse packages are allowed to fill a counter during a fixed length period. At the end of this fixed period the number remaining in the counter corresponds to the product of the two input frequencies multiplied by a scaling constant.

BRIEF DESCRIPTION OF THE DRAWING

The present invention may be better understood and its numerous objects and advantages will become apparent to those skilled in the art by reference to the accompanying drawing which depicts, in block diagram form, a preferred embodiment of the invention.

DESCRIPTION OF THE PREFERRED EMBODIMENT

While not limited thereto in its utility, the present invention may be employed as part of an electronic or electro-mechanical fuel control for a gas generator. Considering the typical fuel control application, a first input signal $f_1$ may be a square wave signal commensurate with a calculated fuel flow ratio. The second input signal $f_2$ may be a sine wave signal having a frequency commensurate with ambient or gas generator compressor inlet pressure. The product of the information contained in the frequencies $f_1$ and $f_2$, accordingly, will be fuel flow rate.

In the interest of accuracy, the incoming signals which are to be multiplied together are frequency scaled so that one is sufficiently higher than the other to enable the resolution required for the apparatus and is also high enough in frequency to meet processing time requirements imposed by the system. Thus, by way of example, a 100:1 frequency ratio enables an accuracy of ± 0.5 percent whereas a 1000:1 frequency ratio enables ± 0.1 percent accuracy. In order to obtain the desired frequency scaling the first or $f_1$ input signal is applied to a frequency scaling circuit 10. Scaling circuit 10 will comprise a frequency multiplier of a type well known in the art which multiplies $f_1$ by a constant. Thus, for example, circuit 10 may employ a phased lock loop circuit of the type which employs an oscillator and phase comparator and which will provide an output frequency which is, for example, five times the input frequency. A commercially available phased lock loop is Signetics Corporation, Part No. 560–561.

The second or $f_2$ input signal is applied to frequency scaling circuit 12. The purpose of circuit 12 is to scale down the input frequency and thus circuit 12 will comprise a frequency divider of a type well known in the art. Thus, again by way of example, frequency scaling circuit 12 may be a ripple-through counter, comprising a series of flip-flops, such as Signetics Corporation Type S–8281.

The output pulse train from frequency scaling circuit 12 is applied to a precision one shot multivibrator indicated generally at 14. Multivibrator 14 includes an RST multivibrator 16, which may be made from two input NAND gates as found in Signetics Corporation Part No. S–8480, a further NAND gate 18 and a frequency divider 20. Frequency divider 20 may be identical to the circuitry employed in frequency scaling circuit 12. Precision multivibrator 14 provides, in the manner to be described below, gating control pulses for an AND gate 22. Gate 22 controls the application of the output pulses provided by frequency scaling circuit 10 to the output counter circuitry.

A second input to the precision multivibrator circuit 14 is derived from a constant frequency, crystal controlled clock 24. The clock circuit 24 is free running and provides pulses at high frequency for delivery both to precision multivibrator 14 and also to a further frequency divider circuit 26. Frequency divider circuit 26, which may also be identical to the frequency scaling circuit 12, provides periodic output signals which are employed for resetting purposes in the counter portion of the invention.

The output counter portion of the invention comprises an input NAND gate 28, an intermediate storage counter 30, an output storage counter 32 and means for clearing counter 30 and periodically strobing the information stored in counter 30 into counter 32. Each of counters 30 and 32 may comprise one or more Signetics Corporation Type S–8281 four bit counters connected in series. These counters include clearing circuitry and have input gates responsive to strobe pulses. The resetting and strobbing circuitry, which is responsive to the output pulses provided by frequency divider 26, includes an AND gate 34 and a pair of one-shot multivibrators 36 and 38.

In operation, input signals $f_1$ and $f_2$ are applied to respective frequency scaling circuits 10 and 12 so as to provide a pair of frequency modulated output signals having a frequency ratio commensurate with the requisite accuracy of the multiplier. The high frequency pulses provided by frequency scaling circuit 10, which may be in the neighborhood of 100 mc., are applied to a first input of AND gate 22. The low frequency pulses provided by frequency scaling unit 12, which may be in the neighborhood of 100 kc., are applied to the set input of RST multivibrator 16 in the precision one-shot multivibrator circuit 14. Presuming that multivibrator 16 has previously been reset, the application of a pulse to circuit 16 from frequency scaling unit 12 will cause the setting of circuit 16 and a positive signal will appear at the Q output and be applied to the second input of gate 22. This positive signal will open gate 22 and permit the delivery of high frequency pulses from scaling circuit 10 to NAND gate 28.

With RST multivibrator 16 in the set condition, a zero signal will appear at the $\overline{Q}$ output and this signal will be applied to a first input of NAND gate 18. The application of this zero signal to gate 18 will open the gate thereby permitting high frequency pulses from clock 24 to be delivered to frequency divider 20. Frequency divider 20 will, after a predetermined period, provide an output pulse which causes multivibrator 16 to be reset. The resetting of multivibrator 16 will remove the enabling signal from gate 22 thus interrupting the delivery of high frequency pulses from scaling circuit 10 to the counting circuitry via gate 28. The combination of gate 18 and frequency divider 20, accordingly, serve to close gate 22 after a preselected and fixed time interval. This time interval will be less than the period between the output pulses provided by frequency scaling circuit 12. Accordingly, each subsequent pulse commensurate with the information on signal $f_2$ as provided by frequency scaling circuit 12 will cause the setting of multivibrator 16 thereby reopening gate 22. Gate 22 will, accordingly, deliver packages of pulses at the output frequency of scaling circuit 10 to NAND gate 28.

Frequency divider circuit 26 will provide a square wave output signal at a comparatively low frequency. The output frequency of divider circuit 26 is selected so that the precision one-shot multivibrator 14 will cycle a plurality of times during each half-cycle of the output signal from the frequency divider. Typically, the output frequency of divider circuit 26 will be in the range of 500 cps. Accordingly, during alternate half-cycles of the output signal from frequency divider 26, gate 28 will be enabled and will pass a plurality of pulse packets to counter 30. The number of pulses comprising each packet will be commensurate with the input frequency $f_1$ while the number of packets delivered to the counter during each time interval as set by frequency divider 26 will be commensurate with input frequency $f_2$.

The output of frequency divider 26 is inverted by gate 34 and applied to a one-shot multivibrator 36. One-shot multivibrator will be responsive to the negative going leading edge of each inverted output pulse from frequency divider 26 and will provide a strobe pulse which is delivered to the strobe input of storage counter 32. The pulses provided by one-shot multivibrator 36 are also applied to a second one-shot multivibrator 38 which is responsive to the negative going trailing edge of the pulse provided by multivibrator 36. Multivibrator 38 will, accordingly, apply a delayed clear pulse to intermediate storage counter 30 to clear counter 30 after the information therein has been strobed into counter 32. After clearing, counter 30 will be ready to receive new input information. The clearing and strobing operation, of course, takes place during periods when gate 28 is disabled by the application of the positive half-cycle of the output signal of frequency divider 26 thereto.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. Frequency multiplier apparatus for obtaining the product of a pair of input signals, said signals being characterized by frequencies proportional to information, the apparatus comprising:

a source of timing pulses;

control pulse generating means responsive to a first of said input signals and said timing pulses for providing gate control pulses, the number of control pulses generated within a preselected time period being commensurate with the frequency of said first input signal;

counter means; and gate means connected to the input of said counter means and responsive to said control pulses, said second input signal being applied to said gate means whereby said gate means will deliver packages of pulses to said counter means, the number of pulses in each package being commensurate with the frequency of the second input signal and the number of packages within the preselected time period being commensurate with the frequency of first input signal, the total number of pulses delivered to the counter means during the preselected period thus being commensurate with the product of the frequencies of the first and second input signals.

2. The apparatus of claim 1 wherein said gate means comprises:

a gating circuit responsive to the control pulses; and frequency scaling means interconnected between said gating circuit and the source of the second input signal, said scaling means increasing the frequency of said second input signal and delivering pulses at a frequency commensurate with said second frequency to said gating circuit.

3. The apparatus of claim 1 wherein said control pulse generating means comprises:

a precision one shot multivibrator, said multivibrator being set by pulses commensurate with the first input signal and being reset by timing pulses whereby control pulses of predetermined duration are generated.

4. The apparatus of claim 1 further comprising:

frequency divider means responsive to said timing pulses for generating an output signal having a period equal to said preselected time period; and means responsive to said frequency divider means output signal for clearing said counter means prior to each time period.

5. The apparatus of claim 4 wherein said control pulse generating means comprises:

a precision one shot multivibrator, said multivibrator being set by pulses commensurate with the first input signal and being reset by timing pulses whereby control pulses of predetermined duration are generated.

6. The apparatus of claim 5 wherein said multivibrator comprises:

a bistable circuit, a signal commensurate with said first input signal being applied to a first input of said bistable circuit, a first output of said bistable circuit being connected to said gate means;

second gate means, said timing pulses being applied to a first input of said second gate means and a second output of said bistable circuit being applied to a second input of said second gate means, said second gate means passing timing pulses when said bistable circuit is in a first state; and second frequency divider means responsive to timing pulses passed by said second gate means, an output of said second frequency divider being connected to the second input of said bistable circuit, timing pulses applied from said second frequency divider to said bistable circuit causing said bistable circuit to change state thereby terminating gate control pulses applied to said gate means each time a pulse commensurate with said first input signal frequency is applied to said bistable circuit.

7. The apparatus of claim 6 wherein said gate means comprises:

a first gating circuit having connected thereto the first output of said bistable circuit whereby gating control pulses are applied to said first gating circuit, pulses at a frequency commensurate with said second input signal also being applied to said first gating circuit; and a second gating circuit, pulse packages passed by said first gating circuit being applied as a first input to said second gating circuit and said frequency divider means output signal being applied as a second input to said second gating circuit, the output of said second gating circuit being applied to said counter means whereby pulse packages are delivered to said counter means only during said preselected time periods.

8. The apparatus of claim 7 further comprising:

first frequency scaling means connected between a source of the second input signal and said gate means for multiplying the frequency of said second input signal by a predetermined integer to provide pulses at a frequency commensurate with the second input signal frequency.

9. The apparatus of claim 8 further comprising:

second frequency scaling means connected between a source of the first input signal and said bistable circuit for dividing the frequency of said first input signal by a predetermined integer to provide pulses at a frequency commensurate with the first input signal frequency.

10. A method of multiplying two variable frequency input signals to obtain the product of information contained in each signal in the form of its frequency comprising the steps of:

generating a number of control pulses of preselected duration per unit of time, the number of pulses being commensurate with the frequency of the first input signal;

employing the control pulses to gate packages of pulses at a frequency commensurate with the frequency of the second input signal; and counting the total number of pulses in the packages gated during the unit of time.

11. The method of claim 10 further comprising the steps of:

multiplying the second input frequency by an integer; and dividing the first input frequency by an integer.

* * * * *